United States Patent [19]

Hengesbach

[11] 4,449,696

[45] May 22, 1984

[54] VALVE WITH HANDLE-MOUNTING RING

[76] Inventor: Robert W. Hengesbach, 7886 Mentor Rd., Mentor, Ohio 44060

[21] Appl. No.: 499,822

[22] Filed: Jun. 1, 1983

Related U.S. Application Data

[63] Continuation-in-part of Ser. No. 313,456, Oct. 21, 1981, abandoned.

[51] Int. Cl.[3] .................... F16K 31/44

[52] U.S. Cl. .................... 251/231; 137/343; 239/283; 248/75

[58] Field of Search ........... 239/283; 137/343, 355.16; 248/75; 251/231

[56] References Cited

U.S. PATENT DOCUMENTS

| | | | |
|---|---|---|---|
| Re. 21,391 | 3/1940 | Holden | 248/75 |
| 1,145,029 | 6/1915 | Munro | 239/368 |
| 1,476,010 | 12/1923 | Gilsenon | 248/75 |
| 1,988,979 | 1/1935 | Campbell | 299/89 |
| 2,072,555 | 3/1937 | Hengesbach et al. | 122/144 |
| 2,125,573 | 8/1938 | Kelley, Jr. | 299/89 |
| 2,302,799 | 11/1942 | Peterson | 299/84 |
| 2,659,629 | 11/1953 | Graham | 299/95 |
| 2,671,626 | 3/1954 | Schmadeke | 248/75 |
| 2,938,534 | 5/1960 | Bos | 137/343 |
| 3,131,834 | 5/1965 | Meshberg | 222/399 |
| 3,181,737 | 5/1965 | Chaucer | 222/136 |
| 3,388,838 | 6/1968 | Marchant | 222/193 |
| 3,632,046 | 1/1972 | Hengesbach | 239/318 |
| 3,675,275 | 7/1972 | Arblaster | 248/75 |
| 3,711,028 | 1/1973 | Hengesbach | 239/288.5 |
| 3,727,841 | 4/1973 | Hengesbach | 239/145 |
| 3,756,273 | 9/1973 | Hengesbach | 137/540 |
| 4,035,004 | 7/1977 | Hengesbach | 285/166 |

OTHER PUBLICATIONS

Tri-Con, Inc., User Price List, Nov. 1, 1982.

*Primary Examiner*—A. Michael Chambers
*Attorney, Agent, or Firm*—David A. Burge

[57] ABSTRACT

A handle-operated flow control valve has handle portions which extend along opposite sides of a valve body. Aligned holes are formed through the handle portions and opposite body side portions. A double-looped support ring formed from resilient metal wire has end portions which extend through the aligned holes to pivotally mount the handle on the body. The loops extend in perpendicularly oriented planes and are configured such that either of them can be used to receive a support hook, whereby the handle-operated valve may be supported in either of two perpendicularly oriented planes by engaging the hook selectively with one or the other of the loops.

3 Claims, 2 Drawing Figures

VALVE WITH HANDLE-MOUNTING RING

Cross-Reference To Related Application

The present application is a continuation-in-part of a copending but now abandoned application Ser. No. 313,456, entitled Sraying Apparatus and Method of Controlling Rate of Discharge of Materials Therefrom, filed Oct. 21, 1981, now abandoned, by Robert W. Hengesbach, hereinafter referred to as the "Spraying Apparatus Case," the disclosure of which is incorporated herein by reference.

BACKGROUND OF THE INVENTION

1. Field of the Invention

The present invention relates to a hand-operated flow control valve, and, more particularly, to double looped support ring which serves both to pivotally mount an operating handle on the body of the valve, and to provide a bi-directionally oriented hanger for supporting the valve from a hook.

2. Prior Art

Handle-operated flow control valves having operating handles which are pivotally connected to valve bodies are known. Exemplary valves of this type are disclosed in U.S. Pat. Nos. 2,072,555, 3,632,046, 3,711,028, 3,727,841, 3,756,273, and 4,035,004, the disclosures of which are incorporated herein by reference.

The flow control valves disclosed in the referenced patents each utilize a rivet which extends through aligned holes formed through a valve body and an operating handle to pivotally mount the handle on the body. The use of a single rivet to pivotally mount an operating handle on a valve body of a flow control valve is undesirable in that a hole must be formed through the full thickness of the body to receive the majority of the length of the rivet. Drilling or otherwise forming time through-hole is an undesirably expensive and time consuming procedure in that it must be performed as a separate and distinct machining operation after the body of the valve has been cast.

Still another drawback of the use of a rivet is that valve assembly is complicated by the need to insert and properly position the rivet in the aligned holes of the body and handle so that crimping or heading of one or both ends of the rivet can be carried out in still another manufacturing procedure. Moreover, care must be taken in crimping or heading the rivet to assure that the rivet is not caused to clamp the handle to the body too tightly thereby inhibiting easy pivoting of the handle relative to the body. In some instances, the type of rivet end formation which results when a rivet is crimped or headed leaves a projection which is unsightly and may tend to snag the clothes of an operator.

A further drawback of handle-operated flow control valves of the type disclosed in the referenced patents is that these valves have no support rings or other structure defining openings which can be used to receive hooks or the like to securely support the valves near workstations where they are to be used.

The referenced Spraying Apparatus Case discloses a handle-operated valve which utilizes a C-shaped ring to pivotally mount an operating handle on a valve body and to provide a single loop which can be used to support the valve from a hook or the like. A problem with a handle-mounting ring of this type is that its C-shape character provides only a mono-planar opening for receiving a support hook, whereby, in some instances hooks and other support formations may not be insertable through the ring, or may cause the valve to be supported in an undesirable direction of orientation.

SUMMARY OF THE INVENTION

The present invention overcomes the foregoing and other drawbacks of prior proposals by providing a novel and improved handle-operated flow control valve having a double-loop handle mounting support ring which not only pivotally mounts an operating handle on the body of the valve but also provides a bidirectional system of support-receiving loops for supporting the valve from a hook or other type of support formation.

In accordance with the preferred practice of the present invention, a handle-operated flow control valve has handle portions which extend along opposite sides of a valve body. Aligned holes are formed through the handle portions and in opposite side portions of the body. A double-looped support ring formed from resilient metal wire has support-receiving loops that extend in each of two perpendicularly oriented planes, and has end portions which extend into the aligned handle and body holes to pivotally mount the handle on the body. The loops are arranged such that either of them may be used to receive a support hook or the like, whereby the valve may be supported in either of two perpendicularly oriented planes by engaging the hook with one or the other of the loops.

BRIEF DESCRIPTION OF THE DRAWING

These and other features and a fuller understanding of the invention will be had by referring to the following description and claims taken in conjunction with the accompanying drawing, wherein:

DESCRIPTION OF THE PREFERRED EMBODIMENT

Figure 1:
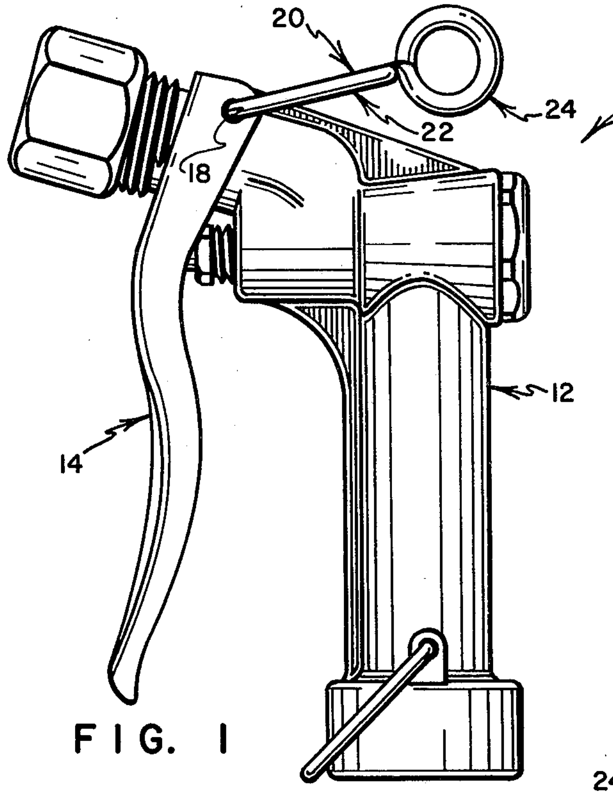
FIG. 1 is a side elevational view of a handle-operated flow control valve including a double-loop support ring which embodies the preferred practice of the present invention; and, FIG. 2 is an exploded perspective view of the valve of FIG. 1.
Figure 2:
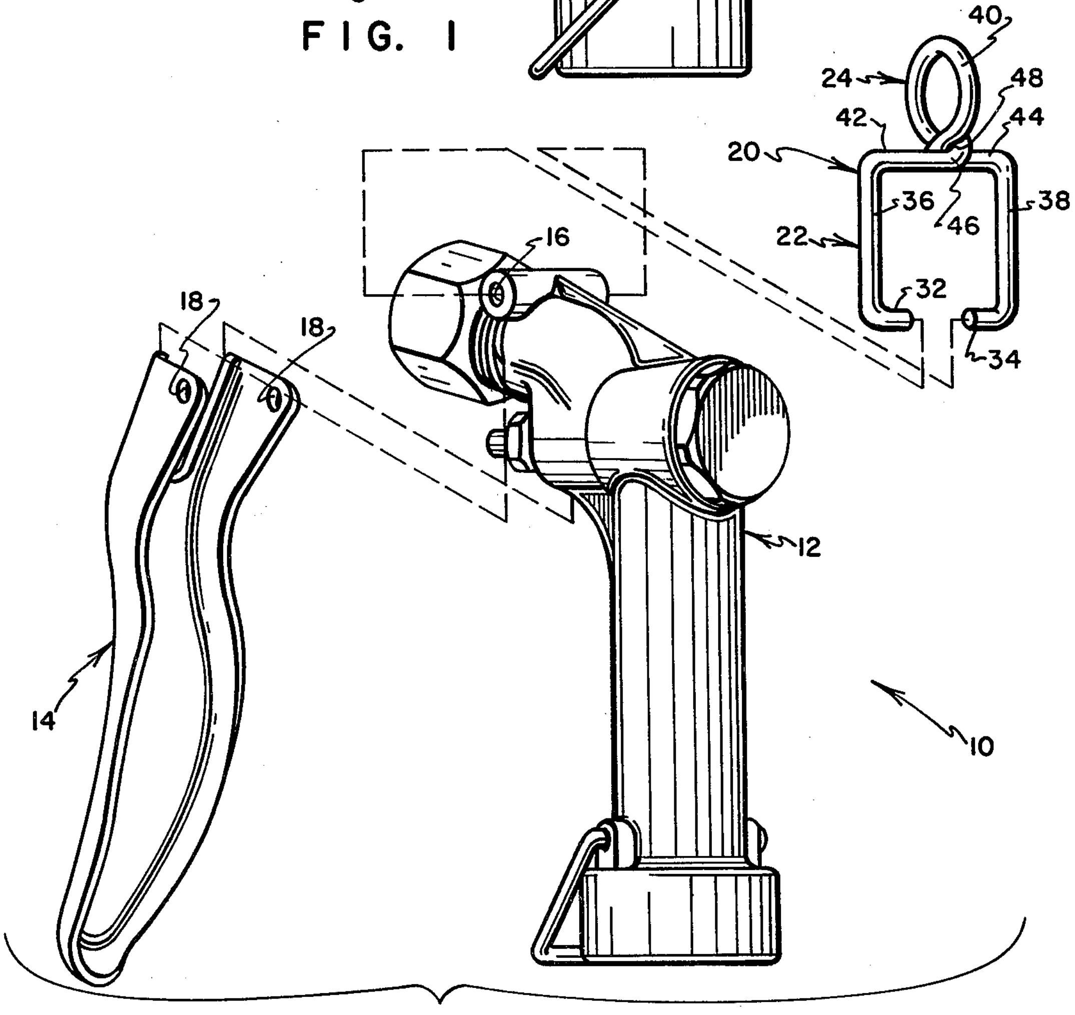

Referring to FIGS. 1 and 2, a handle-operated flow control valve is indicated generally by the numeral 10. The valve 10 has a body assembly 12 and an operating handle 14 which are pivotally interconnected by a support ring 20. The body assembly 12 and the handle 14 preferably take the form of such body assemblies and handles disclosed in the referenced patents and Spraying Apparatus Case, the disclosures of which are incorporated herein by reference.

Referring to FIG. 2, the body assembly 12 has a pair of identical outwardly opening holes formed on opposite sides thereof, one of which is indicated by the numeral 16. The handle 14 has a pair of aligned holes 18 which can be positioned to overlie and align with the holes 16.

The support ring 20 is formed from resilient metal wire which is configured to define a lower C-shaped loop indicated by the numeral 22, and a upper circular-shaped loop indicated generally by the numeral 24.

Referring to FIG. 2, the C-shaped loop 22 has lower leg portions 32, 34 which extend toward each other along a common axis, (not shown), upwardly-extending legs 36, 38 which extend parallel to each other, and cross-extending leg portions 42, 44 which parallel the lower leg portions 32, 34. All of the leg elements 32, 34, 36, 38, 42, 44 of the C-shaped ring 22 extend in a common plane.

The circular-shaped loop 24 is formed by a circular winding of wire 40 which is interposed between the leg portions 42, 44, and which is joined thereto by a pair or curved transitional portions 46, 48 that are twisted to wrap snugly about each other.

Referring to FIG. 1, the support ring 20 is connected to the body assembly 12 and to the handle 14 by inserting the lower leg portions 32, 34 each through a separate one of the aligned sets of body and handle holes 16, 18. The resilient character of the spring-like wire from which the support ring 20 is made enable the leg portions 32, 34 to be spread apart sufficiently to effect this assembly, and to provide a connection which securely holds the handle 14 securely in place on the body assembly 12.

By virtue of the loops 22, 24 extending in perpendicularly oriented planes, a support hook or other elongate support formation (not shown) of conventional configuration can be inserted selectively into either of the loops 22, 24 to support the handle-operated flow control valve 10 in either of two perpendicularly oriented planes. The provision of the circular loop 24 at a location overlying an imaginary plane which extends centrally through the assembled valve 10 provides a balanced connection point which enables the flow control valve 10 to be conveniently supported even when a fluid supply hose or the like is connected to the body assembly 12.

A feature of the resilient nature of the double-looped support ring 20 is that its lower leg portions 32, 34 and its upwardly extending legs 36, 38 are resiliently biased toward each other to provide a slight clamping action which clampingly engages such portions of the handle 14 as surround the handle-mounting holes 18. This biasing action gives the flow control valve assembly 10 a proper "feel" of precision-fitted parts, without causing opposed portions of the handle 14 to be clamped too tightly into engagement with opposite sides of the body assembly 12, as has been known to occur where an elongate rivet has been utilized to form a pivotal connection between the handle and body assembly.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A handle-operated flow control valve, comprising:

(a) a valve body having valving means for controlling a flow of fluid through the body, and body portions an opposed slides thereof which define a pair of oppositely opening mounting formations that extend along a common axis;

(b) handle means for operating the valving means and having handle portions which extend closely alongside the body portions and which have mounting holes formed therethrough that coaxially align with the mounting formations; and, (c) a one piece handle mounting ring formed from a single piece of resilient metal wire and having axially aligned end portions which extend coaxially with respect to and through the mounting holes and into the mounting formations to pivotally mount the handle means on the valve body for movement about the common axis, the mounting ring having a pair of support formations formed intermediate the end portions, the support formation defining first and second hook-engageable loops, with the first of the loops extending in a first plane which includes the common axis, with the second of the loops extending in a second plane that is substantially perpendicular to the first plane, and with the first and second loops being interconnected by a pair of curved transitional portions that are formed by twisting overlapping portions of the metal wire to form curved transitional portions that wrap snugly about each other to assist in inhibiting movement of the axially aligned end portions in directions relatively apart from each other.

2. The valve of claim 1 wherein portions of the metal wire which define the first loop provide the first look with a generally C-shaped configuration, and portions of the metal wire which define the second loop provide the second loop with a generally circular configuration.

3. The valve of claim 1 wherein the valve body and the handle means have portions which are symmetrical about a common imaginary plane extending substantially centrally therethrough, and the portions of the metal wire which define the second loop extend in said common plane.

* * * * *